United States Patent
Ruegenberg et al.

(10) Patent No.: US 6,724,960 B1
(45) Date of Patent: Apr. 20, 2004

(54) OPTICAL COUPLING DEVICE

(75) Inventors: Gervin Ruegenberg, Munich (DE); Frank Zimmer, Scheuring (DE)

(73) Assignee: Avanex Corporation, Fremont, CA (US)

( * ) Notice: Subject to any disclaimer, the term of this patent is extended or adjusted under 35 U.S.C. 154(b) by 81 days.

(21) Appl. No.: 10/031,899

(22) PCT Filed: Jul. 21, 2000

(86) PCT No.: PCT/DE00/02399

§ 371 (c)(1), (2), (4) Date: May 2, 2002

(87) PCT Pub. No.: WO01/07956

PCT Pub. Date: Feb. 1, 2001

(30) Foreign Application Priority Data

Jul. 21, 1999 (DE) .......................... 199 34 185

(51) Int. Cl.$^7$ .............................. G02B 6/26; G02B 6/42
(52) U.S. Cl. .............................. 385/52; 385/16; 385/39; 385/50
(58) Field of Search .............................. 385/16, 39, 50, 385/52

(56) References Cited

U.S. PATENT DOCUMENTS

| | | | |
|---|---|---|---|
| 4,657,339 A | 4/1987 | Fick | |
| 5,212,745 A | * 5/1993 | Miller | ........................ 385/25 |
| 5,844,667 A | * 12/1998 | Maron | ........................ 356/35.5 |
| 5,848,206 A | 12/1998 | Labeye et al. | |
| 5,951,065 A | * 9/1999 | Roesner et al. | ............. 285/318 |

FOREIGN PATENT DOCUMENTS

| | | | |
|---|---|---|---|
| DE | 3716836 A1 | * 1/1988 | ............ G02B/6/24 |
| EP | 0 767 921 | 10/1998 | |
| JP | 57042827 A | * 3/1982 | ............ G01K/5/48 |
| WO | WO 98/13718 | 4/1998 | |

* cited by examiner

Primary Examiner—John D. Lee
Assistant Examiner—Tina M Lin
(74) Attorney, Agent, or Firm—Wilson, Sonsini, Goodrich & Rosati; Kinta Suzue

(57) ABSTRACT

An optical coupling device for coupling light in between two optical waveguide end faces, in which the geometric position of one optical waveguide end face can be varied with respect to the other optical waveguide end face with the aid of a variable-length element. The element carries one of the two optical waveguides, and is connected to the other optical waveguide via a holding block. The variable-length element is connected to a variable-length compensating element, whose length changes with temperature by the same amount but in the opposite sense as that of the variable-length element. The variable-length compensating element is fixed to the second holding block.

12 Claims, 1 Drawing Sheet

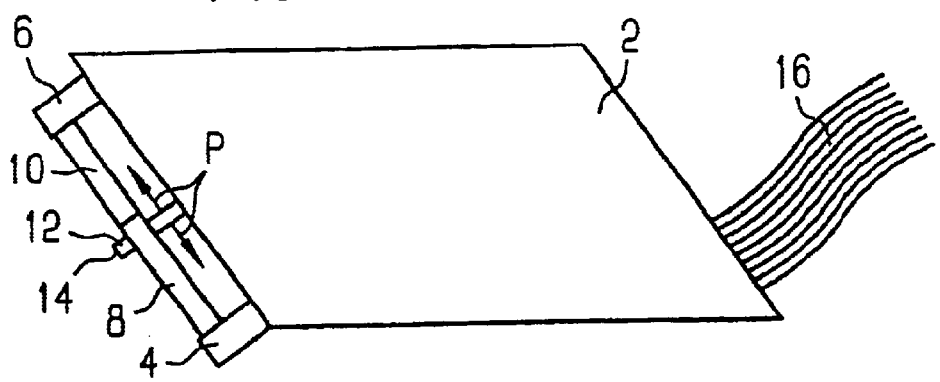
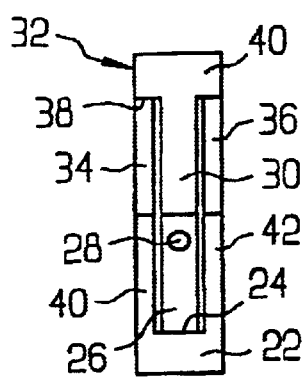
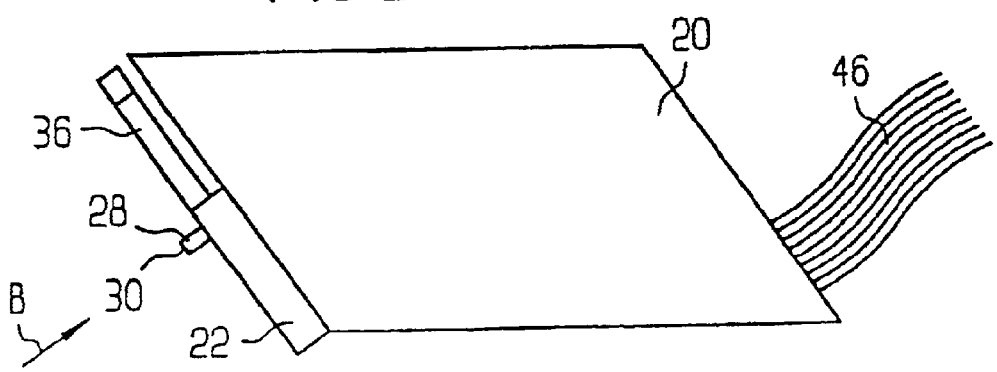

OPTICAL COUPLING DEVICE

CROSS-REFERENCE TO RELATED APPLICATIONS

This application claims the benefit of priority under 35 U.S.C. §119 of German Patent Application No. 19934185.0 filed Jul. 21, 1999, and is a national stage filing under 35 U.S.C. §371 of PCT Application PCT/DE00/02399, filed Jul. 21, 2000.

FIELD OF THE INVENTION

The invention relates to an optical coupling device for injecting light between two optical waveguide end faces, the geometric position of one optical waveguide end face, for example of an optical fibre, being capable of being varied with respect to the other optical waveguide end face, for example of a strip conductor of an optical component, with the aid of a variable-length element, which carries one of the two optical waveguides via a holding element and is connected to the structure containing the other optical waveguide, or is fixed to said structure, by means of at least one holding block.

BACKGROUND OF THE INVENTION

An optical coupling device is disclosed, for example, by WO 98/13718. Coupling devices of this type are used in optical filters based on the phased-array principle having an input coupling face which light enters at a specific geometric position, the geometric position influencing the output wavelength of the optical filter. Optical filters based on the phased-array principle are used in particular as multiplexers or demultiplexers in optical wavelengths multiplex operation (WDM), since they exhibit low insertion attenuation and high crosstalk suppression.

German patent application DE 44 22 651.9 describes how the centre wavelength of a phased-array filter can be defined by the position of an input coupling optical waveguide which leads the light into the optical waveguide. In this way, the centre wavelength of the optical filter can be adjusted exactly by means of the geometric positioning of the input coupling optical waveguide or the input coupling fibre.

Optical coupling devices are also used in narrow-band wavelength multiplexers (DWDM) for optical waveguide transmission technology. These components make it possible, on the transmitter side, to combine the signals from lasers of various wavelengths with low losses onto a single glass fibre or, respectively, on the receiver side, to divide said signals to a corresponding number of receivers in a wavelength-selective manner.

The particular advantage of narrow-band wavelength multiplexers as compared with conventional wavelength multiplexers lies in their narrow-band nature. As a result, such a small channel spacing is possible that, at the minimum attenuation of the glass fibre, that is to say in the wavelength range around 1550 nm, a large number of transmission channels, for example 32 transmission channels, can be accommodated. A DWDM comprises a chip, to which waveguide structures with the necessary geometry are applied. On the receiver side, the input of the chip is the fibre with the multiplexer signal, which is also referred to as the input coupling fibre. On the output coupling side, a corresponding number of fibres are fitted, which lead the individual signals on to the receiver.

In optical waveguide transmission technology with DWDM, the problem is that the characteristics of the chip change sharply with the operating temperature. A temperature change leads to a change in the refractive index relationships and also the geometric relationships of the chips. As a result, wavelength shifts occur, that is to say the branch of the channel between DWDM and the lasers and, respectively, between the transmitter side and the receiver side is shifted. For this reason, the shift in the centre wavelengths must be avoided.

In order to avoid the temperature effects described, passive temperature compensation has already been proposed. The temperature dependence of the centre wavelength can be compensated for by the fact that the input coupling fibre is shifted vertically with respect to the DWDM chip as a function of the temperature. This shift is carried out by means of a variable-length component which, as compared with the carrier material of the chip, has a higher thermal coefficient of expansion, for example by means of a variable-length element made of aluminium. Then, as was described at the beginning, the optical fibre is fixed to the variable-length element, so that the end faces of the optical fibre and of the optical conductor chip (also called a planar waveguide or a planar waveguide chip) are shifted parallel to one another, which compensates for the influence of the temperature on the centre wavelength.

In the practical implementation of this coupling device, the connecting points between the holding block and the chip, on the one hand, and the holding block and the variable-length element, on the other hand, are designed using adhesive bonding technology. In this case, the bonding point between the holding block and the chip is cured after the input coupling fibre has been positioned optically relative to the chip.

In the case of this technology, the problem arises that the bonded connections are subject to temperature-dependent changes. As a result of different bond gap widths, inhomogeneities and gassing-out of the adhesive, mechanical stresses arise in the gap. This is particularly critical in the case of bonded connections between materials with different coefficients of thermal expansion, such as aluminium and glass or glass ceramic. The consequence of the thermally inducted stresses is that a temperature change not only affects the desired movement of the end faces of the optical conductor elements in relation to each other, but also movements perpendicular thereto, that is to say perpendicular to the plane of the chip or away from the chip. These movements are undesired, since they lead to an increase in the attenuation at the input coupling point. The undesired movements may be prevented, at least partially, by means of fixing the free end of the variable-length element, but the fixing has to be configured in such a way that the desired temperature-dependent movement is permitted.

It has already been proposed to provide a displaceable guide on the other holding block. However, this type of fixing requires very close machining tolerances of the components and a great deal of precision mechanical effort. Nevertheless, problems arise as a result of friction and play in the guide.

SUMMARY OF THE INVENTION

By contrast, the invention provides an optical coupling device in which movements of the end face of the optical fibre which movements are perpendicular to this face are suppressed and, at the same time, the desired movement of the end face of this optical fibre parallel to the end face of another optical fiber or waveguide such as a planar waveguide, is permitted. In particular, an optimal coupling device is to be provided which is compatible with the established manufacturing and adhesive bonding methods and permits adjustment of the input coupling point before adhesive bonding.

Further, the optical coupling device mentioned in the Field of the Invention contains, among other elements, a variable-length element which is connected to a variable-length compensating element, whose length changes with the temperature by the same amount but in the opposite sense as that of the variable-length element, and in that the variable-length compensating element is fixed to a second holding block.

The variable-length element, which can consist of aluminium, for example, in this embodiment of the invention is lengthened by a compensating element made of a material with a negative coefficient of expansion, so that the result overall is the same thermal expansion as in the carrier material, for example quartz glass. As a result, although the input coupling fibre is shifted in the desired manner, that is to say the end face of the input coupling fibre moves parallel to the input coupling face of the chip, no relative movement takes place between the fixing points of the two holding blocks and the carrier material, that is to say the chip, since the total length of the variable-length element and variable-length compensating element is always of the same size. Therefore, the stresses and shifts described above are minimized.

A further advantageous refinement of the device according to the invention is that the length of the variable-length compensating element is selected, taking its coefficient of expansion into account, such that the length of the variable-length compensating element changes by the same amount but in the opposite sense or amount as that of the variable-length element. In other words, only the combination of the influences of the length of the compensating element and its coefficient of expansion matters, so that accurate matching of the coefficient of expansion is not necessary.

In the optical coupling device first mentioned in the Field of the Invention, the holding block has a U-shaped part made of a material with the same coefficient of thermal expansion as the chip, in that a T-shaped part made of a material with the same coefficient of thermal expansion as the chip is provided, and in that the variable-length element with the positive coefficient of thermal expansion is connected to the T-shaped part at its foot and to the U-shaped part at its base, and in that two variable-length elements with a positive coefficient of thermal expansion are fixed to the legs of the U-shaped part, which consist of the same material as the variable-length element and have the same length as the latter, and which, on one side, are fixed to the legs of the U-shaped part and, on the other side, to the underside of the crossbar of the T-shaped part. This coupling device is fixed or adhesively bonded to the chip with the aid of the U-shaped part. By means of the identical thermal expansions of the three columns formed by the variable-length elements and the U-shaped and the T-shaped part, permanent adhesive bonding of the individual parts is made possible, without the connection points being stressed as a result of temperature expansions. Therefore, the input coupling fibre can advantageously carry out the desired temperature-dependent movements. As a result of the additional parts, the desired fixing of the upper end of the variable-length element is achieved, so that temperature-dependent and time-dependent changes in the adhesive bonding point between the U-shaped part and the variable-length elements can have only a minimal effect. Only the U-shaped part is connected or adhesively bonded to the chip, and all the other parts can move freely and, therefore, are able to shift in the event of fluctuating temperatures and corresponding expansion of the variable-length elements with a positive coefficient of thermal expansion.

A further advantageous refinement of the device according to the invention is that the variable-length elements consist of aluminium which, because of its material characteristics, is preferred for this purpose.

Finally, a further advantageous refinement of the device according to the invention is that the material of the variable-length compensating elements is a glass ceramic with a negative coefficient of thermal expansion, preferably the material of the chip. This achieves a minimum influence of temperature changes between chip and holding block.

BRIEF DESCRIPTION OF THE DRAWINGS

Exemplary embodiments of the invention will be described by using the appended drawings, in which:

FIG. 1 shows a side view of a coupling device according to a first exemplary embodiment of the invention;

FIG. 2 shows a plan view of a second exemplary embodiment of the coupling device according to the invention with the viewing direction in accordance with the arrow B in FIG. 3; and FIG. 3 shows a side view of the second exemplary embodiment of the coupling device according to the invention.

FIG. 1 shows an optical waveguide chip 2 (also commonly known as a planar waveguide) on which, via two holding blocks 4, 6 (for example glass or glass ceramic), a variable-length element 8 made of aluminium, a variable-length compensating element 10 made of a material with a negative coefficient of thermal expansion and a ferrule 12 are held, by means of which an optical fibre 14 is held in an input coupling position on the optical waveguide chip 2. The ferrule 12 moves in the direction of the double arrow P.

In this embodiment, in other words, the variable-length element 8 is lengthened by means of a variable-length compensating element 10, so that overall, the result is the same thermal expansion as in the case of the carrier material of the optical waveguide chip, for example, quartz glass. This means that, in the event of temperature changes, the input coupling fibre is shifted in the desired way in order to compensate for the centre wavelength, but that no relative movement takes place between the fixing points of the holding blocks 4, 6 and the optical waveguide chip 2.

Possible glass ceramic materials which have a negative coefficient of thermal expansion can be obtained under the names ROBAX® or CERODUR®. Since the magnitudes of the coefficients of expansion of these materials, as compared with the coefficient of thermal expansion of the variable-length element 8 made of aluminium, are different, the length of the compensating element 10 is matched in such a way that, overall, the result is thermal expansion as in the case of the carrier material, quartz glass.

On the side of the optical waveguide chip 2 located opposite the input coupling side, the output coupling fibres 16 are illustrated.

FIGS. 2 and 3 show a plan view and a side view, respectively, of a second exemplary embodiment of the coupling device according to the invention, FIG. 2 having to be viewed in the viewing direction of the arrow B of FIG. 3. In this exemplary embodiment, a U-shaped part 22 is provided as a holding block belonging to the coupling device on an optical waveguide chip 20. Fixed to the base 24 of the U-shaped part is a first variable-length element 26, which carries the ferrule 28 in which the fibre 30 is fixed. The other end of the variable-length element 26 is fixed to the foot 30 of a T-shaped part 32. Two second variable-length elements 34, 36 are fixed to the underside 38 of the crossbar 40 of the T-shaped element 32 and, on the other side, to the ends of legs 40, 42 of the U-shaped part 22. In this exemplary embodiment, the variable-length parts 26, 34, 36 are made of aluminium, which has a positive coefficient of thermal expansion, and the T-shaped part 32 and the U-shaped part 33 are made of glass ceramic, preferably of the same material as the optical waveguide chip 20, the said material having the same coefficient of thermal expansion as the optical waveguide chip.

This construction results in three "columns", which in each case consist half of aluminium and half of glass material. As a result, all three "columns" in each case exhibit the same overall temperature expansion. Permanent adhesive bonding of the individual parts is therefore possible, without the connecting points being stressed as a result of temperature expansion. By means of the additional parts, the desired fixing of the upper end of the variable-length element 26 is achieved, so that temperature-dependent and time-dependent changes in the bonding point between the U-shaped part 22 and the variable-length element 26 no longer have any effect. Only the U-shaped parts 22 is connected to the optical waveguide chip 20 or adhesively bonded thereto. All the other parts of the coupling device can move freely and can therefore shift in the event of expansion of the variable-length elements corresponding to fluctuating temperatures. Output coupling fibres 46 are again shown on the output coupling side of the optical waveguide chip 20.

What is claimed is:

1. An optical coupling device for coupling light between two optical waveguide end faces, said device comprising:
    two optical waveguides having end faces,
    a variable-length element which carries one of the two optical waveguides via a holding element and is fixed to the other optical waveguide by at least one holding block;
    a variable-length compensating element which is connected to the variable-length element, and is fixed to a second holding block;
    wherein the length of the variable-length compensating element changes with temperature by the same amount, but in the opposite sense, as that of the variable-length element; and
    wherein the geometric position of one optical waveguide end face is capable of being varied with respect to the other optical waveguide end face by movement of the variable-length element.

2. The coupling device according to claim 1, wherein the length of the variable-length compensating element is selected, taking its coefficient of expansion into account, such that the length of the variable-length compensating element changes by the same amount but in the opposite sense as that of the variable-length element.

3. The optical coupling device according to claim 1, wherein the variable-length element is made of aluminium.

4. The optical coupling device according to claim 2, wherein the variable-length element is made of aluminium.

5. The coupling device according to claim 1, wherein the material of the variable-length compensating element is a glass ceramic.

6. The coupling device according to claim 2, wherein the material of the variable-length compensating element is a glass ceramic.

7. The coupling device according to claim 3, wherein the material of the variable-length compensating element is a glass ceramic.

8. The coupling device according to claim 4, wherein the material of the variable-length compensating element is a glass ceramic.

9. The optical coupling device for injecting light between two optical waveguide end faces, the geometric position of one optical waveguide end face, for example of an optical fibre, being capable of being varied with respect to the other optical waveguide end face, for example of an optical waveguide chip, with the aid of a variable-length element, said coupling device comprising:
    a variable-length element which carries one of the two optical waveguides via a holding element and is fixed to the other optical waveguide by means of at least one holding block, wherein the holding block has a U-shaped part made of a material with the same coefficient of thermal expansion as the other optical waveguide, and further in that a T-shape part made of a material with the same coefficient of thermal expansion as the other optical waveguide is provided, wherein further that the variable-length element with the positive coefficient of thermal expansion is connected to the T-shaped part at its foot and to the U-shaped part at its base, and wherein further in that two variable-length elements with a positive coefficient of thermal expansion are fixed to the legs of the U-shaped part, which consist of the same material as the variable-length element and have the same length as the latter and which, on one side, are fixed to the legs of the U-shaped part and, on the other side, to the underside of the crossbar of the T-shaped part.

10. The coupling device according to claim 9, wherein the variable-length elements consist of aluminium.

11. The coupling device according to claim 5, wherein the material of the U-shaped part and of the T-shaped part is a glass ceramic with the same coefficient of thermal expansion as the other optical waveguide.

12. The coupling device according to claim 11, wherein the material of the U-shaped part and the material of the T-shaped part is the same as the other optical waveguide.

* * * * *